(12) United States Patent
Fone

(10) Patent No.: US 6,391,375 B1
(45) Date of Patent: May 21, 2002

(54) PET FOOD CONTAINING CHICORY

(75) Inventor: Janel Fone, Melton Mowbray (GB)

(73) Assignee: Mars UK Limited, Slough (GB)

( * ) Notice: Subject to any disclaimer, the term of this patent is extended or adjusted under 35 U.S.C. 154(b) by 0 days.

(21) Appl. No.: 09/561,052

(22) Filed: Apr. 28, 2000

Related U.S. Application Data

(63) Continuation of application No. PCT/GB98/03256, filed on Oct. 30, 1998.

(51) Int. Cl.$^7$ .............................. A23K 1/14; A23K 1/18
(52) U.S. Cl. ....................................... 426/635; 426/805
(58) Field of Search .................................. 426/635, 805

(56) References Cited

U.S. PATENT DOCUMENTS

| | | | |
|---|---|---|---|
| 4,613,377 A | | 9/1986 | Yamazaki et al. ............. 127/39 |
| 4,734,402 A | | 3/1988 | Hashimoto et al. ............ 514/54 |
| 5,744,134 A | * | 4/1998 | Paul ........................... 424/93.4 |
| 5,776,524 A | | 7/1998 | Reinhart ........................ 426/2 |
| 5,840,361 A | * | 11/1998 | Theuer et al. ............... 426/615 |
| 5,952,033 A | * | 9/1999 | Anantharaman et al. .... 426/615 |
| 5,968,569 A | * | 10/1999 | Cavadini et al. .............. 426/61 |

FOREIGN PATENT DOCUMENTS

| | | | |
|---|---|---|---|
| CH | 570117 | 12/1975 | ....................... 1/14 |
| EP | 0293935 | 12/1988 | ....................... 1/16 |
| EP | 0 627 172 A1 | 12/1994 | |
| EP | 674 842 | * 4/1995 | |
| EP | 0680782 | 11/1995 | ....................... 20/24 |
| EP | 0850569 | 7/1998 | ....................... 1/14 |
| JP | 63-309147 | 12/1988 | |

OTHER PUBLICATIONS

Diez et al., Ann. Med. Vet., vol. 142, pp. 185–201, (Translated Copy), 1998.*

Translation of the abstract to Hornick, Diez M., et al.; Etude des fibres alimentaires chez le chien: présentation des résultats de 7 essais expérimentaux; Ann. Med. Vet., 1998, 142, 185–201.

Hornick, Diez M., et al; Etude des fibres alimentaires chez le chien: présentation des résultats de 7 essais experimentaux; Ann. Med. Vet., 1998, 142, 185–201.

Willard, M. D. et al; Effects of dietary supplementation of fructo–oligosaccharides on small intestinal bacterial overgrowth in dogs; Am J Vet Res, vol. 55, No. 5, May 1994, pp. 654–659.

Mortensen, P. B. and M. R. Clausen; Short–chain Fatty Acids in the Human Colon: Relation to Gastrointestinal Health and Disease; Scand J Gastroenterol 1996; 31 Suppl. 216:132–48.

Hallman, J. et al.; Cellulose, Beet Pulp, and Pectin/Gum Arabic Effects on Canine Colonic Microstructure and Histopathology; Veterinary Clinical Nutrition, vol. 2, No. 4, 1995, pp. 137–142.

Hallman, J. et al.; Colonic Mucosal Tissue Energetics and Electrolyte Transport in Dogs Fed Cellulose, Beet Pulp or Pectin/Gum Arabic as Their Primary Fiber Source; Nutrition Research, vol. 16, No. 2, pp. 303–313, 1996.

Gibson, G. R. and Roberfroid, M. B.; Dietary Modulation of the Human Colonic Microbiota: Introducing the Concept of Prebiotics; American Institute of Nutrition 1995, Critical Review 0022–3166/95; pp. 1401–1412.

Wang, X. and Gibson, G. R.; Effects of the in vitro fermentation of oligofructose and inulin by bacteria growing in the human large intestine; Journal of Applied Bacteriology 1993, 75, 373–380.

Fahey, G. Jr. et al.; Dietary Fiber for Dogs: I. Effects of Graded Levels of Dietary Beet Pulp on Nutrient Intake, Digestibility, Metabolizable Energy and Digesta Mean Retention Time, J. Anim. Sci. 1990. 68:4221–4228.

Fahey, G. Jr. et al.; Dietary Fiber for Dogs: II. Iso–Total Dietary Fiber (TDF) Additions of Divergent Fiber Sources to Dog Diets and Their Effects on Nutrient Intake, Digestibility, Metabolizable Energy and Digesta Mean Retention Time, J. Anim. Sci. 1990. 68:4229–4235.

Fahey, G. Jr. et al.; Dietary Fiber for Dogs: III. Effects of Beet Pulp and Oat Fiber Additions to Dog Diets on Nutrient Intake, Digestibility, Metabolizable Energy, and Digesta Mean Retention Time, J. Anim. Sci. 1992. 70:1169–1174.

Sunvold, G. et al.; Dietary Fiber for Dogs: IV. In Vitro Fermentation of Selected Fiber Sources by Dog Fecal Inoculum and In Vivo Digestion and Metabolism of Fiber–Supplemented Diets, J. Anim. Sci. 1995. 73:1099–1109.

Sunvold, G. et al.; In Vitro Fermentation of Selected Fibrous Substrates by Dog and Cat Fecal Inoculum: Influence of Diet Composition on Substrate Organic Matter Disappearance and Short–Chain Fatty Acid Production; J. Anim. Sci. 1995. 73:1110–1122.

* cited by examiner

*Primary Examiner*—Chhaya D. Sayala
(74) *Attorney, Agent, or Firm*—Fulbright & Jaworkski LLP

(57) ABSTRACT

The present invention relates to a pet food product which comprises chicory in an amount which maintains good faeces quality or improves the faeces quality of a pet and/or maintains good gastrointestinal tract health or improves the gastrointestinal health of a pet. It also relates to the use of chicory in achieving these results, a method for achieving them and a process for the preparation of such a pet food product.

17 Claims, No Drawings

PET FOOD CONTAINING CHICORY

This is a continuation application of PCT/GB98/03256 filed Oct. 30, 1998.

FIELD OF THE INVENTION

The present invention relates to a pet food product which comprises chicory in an amount which maintains good faeces quality or improves the faeces quality of a pet and/or maintains good gastrointestinal tract health or improves the gastrointestinal health of a pet. It also relates to the use of chicory in achieving these results, a method for achieving them and a process for the preparation of such a pet food.

BACKGROUND OF THE INVENTION

The maintenance and improvement of pet health is a constantly ongoing aim in the art. Pet health can be monitored in a number of ways. Two of these are faeces quality and gastrointestinal (GI) tract health. Good quality faeces in pet animals is of two-fold importance. Firstly, it is a good indicator of a healthy pet. It is known that good faeces quality usually reflects healthy colonic structure and function.

Secondly, it is a much favored practicality for pet-owners. Accordingly, the maintenance of good quality pet faeces and the ability to improve the quality of pet faeces is a constantly ongoing aim in the art. It is also an ongoing aim in the art to improve the GI tract health of pet animals. The ability to maintain and improve GI tract health can be beneficial to pet owners because it has an impact on their pet's overall health.

One method for maintaining normal gastrointestinal function and ameliorating chronic diarrhoea in animals has included the addition, in pet food products, of a fibre source which contains a significantly higher proportion of insoluble fibres to soluble fibres, which are either non-fermentable or only moderately fermentable. EP-A-0 674 842 teaches that maintaining normal gastrointestinal function in pets is important and teaches that beet pulp produces the best results. Zentek, J., in J. Anim. Physiol. a. Anim. Nutr. 75 (1996), 36–45, confirms the teaching in EP-A-0 674 842 regarding the use of fairly insoluble fibre sources as advantages on the nutrient digestibility and microbial metabolism of the intestinal tract in dogs and describes that fairly soluble fibre sources such as guar gum and pectin may induce an undesired smeary faecal consistency.

The present invention provides a fibre source, the use of which results in: i) Significantly improved (or maintenance of good) faeces quality and/or ii) Significantly improved (or maintenance of good) gastrointestinal (GI) tract health, in pet animals over the fibre sources of the prior art. The improvement of the faecal quality and/or GI tract health according to the present invention is completely unexpected. One reason for this includes the fact that the fibre used is primarily soluble (compared to the insoluble fibres previously taught to give good faeces quality) and the fibre appears to be more rapidly fermentable than fibres used in the prior art. The rapid fermentation of the fibres has, to date, been considered by a person skilled in the art as a potential cause of diarrhoea in pet animals.

Accordingly, a first aspect of the invention provides a pet food product which comprises chicory in an amount which: i) maintains good faeces quality or improves the faeces quality of a pet and/or ii) maintains good GI tract health or improves it. The present invention demonstrates that the incorporation of chicory fibre into a pet diet, in one facet, results in the maintenance of good faeces quality and/or the improvement in faeces quality in the pet. In a further facet, the incorporation of chicory into a pet food product results in the maintenance of a healthy GI tract or improves the health of the GI tract.

DETAILED DESCRIPTION OF THE PREFERRED EMBODIMENT

Chicory is a blue flowered plant (*Cichorium intybus*), named ENDIVE in the US, which is cultivated for its salad leaves and its root (roasted and ground for use with, or instead of, coffee). Its primary components are i) inulin and ii) soluble and fermentable fibres. Inulin is a soluble polysacchaiide, composed of polymerized fructose molecules, occurring as stored food material in many plants, such as members of the Compositae species and in dahlia tubers. However, it is not the endogenous inulin of chicory, but rather the fibre, which imparts the advantageous effect in maintaining and/or improving faecal quality in pet animals. This is demonstrated herein by the fact that the chicory plant, which has had the majority of the inulin extracted (resulting in a chicory pulp) provides the most useful and effective form of chicory fibre for the present invention and by experiments by the inventors (data not shown) which have shown that the addition of inulin, without the chicory fibres, does not improve faeces quality in pet animals.

The chicory plant itself can be incorporated into an animal pet food in order to provide a pet food product according to the first aspect of the invention. The quantity of the plant to be incorporated, in order to provide sufficient fibre, can be deteimined in a straightforward manner by measuring plant quantity and feeding to pet animals in order to determine a range of amounts which: i) maintains good faeces quality or improves the faeces quality of a pet and/or ii) maintains good GI tract health or improves it. The quantity of chicory plant to be included may vary somewhat due to a variety of factors such as the plant type, the plant age, the part of the plant etc. The root of the plant is preferred as it provides a higher dry matter content over other parts of the plant, such as the stem, leaf and/or flower which may also be used.

However, the incorporation of the chicory plant itself is not necessary in accordance with the invention. It is actually preferred that the first aspect of the invention is formulated by the inclusion of fibre-containing chicory plant extract (or the remains of the plant following extraction of other material). Suitable extracts/remains include those where some or most of the inulin has been removed (extracted) to leave a chicory pulp. The inulin content may be anything from less than 0.25%, less than 0.5%, from 0.5% to 1%, preferably from about 0.3% to about 0.8% on a dry matter basis of the total pet food product. The exact content of any chicory pulp will depend on the extraction process that has been used. Extraction of inulin from chicory plants is known in the art and has been practised since as long ago as 1927.

The most common extraction process is of chicory root and is similar to the extraction of sucrose from sugar beet (diffusion in water). The extraction removes inulin to leave a chicory pulp. Preferably, according to the invention, as much inulin is removed as possible, resulting in a chicory pulp which has a high fibre content. Typical extraction processes usually result in a chicory pulp containing up to around 45% dietary fibre, as measured by the Englyst method and only around 5 to 10% inulin (remainder of the pulp provides approximately 12% water, 9% protein, 1% fat, 9% ash, and up to 19% carbohydrate). The present invention includes all chicory pulp which can be obtained from chicory plants, including the whole range of possible fibre and inulin content. The pulp is preferably obtained from at least chicory root material. The chicory may be incorporated into a pet food product with the same composition as directly produced from the extraction procedure. Alternatively, the pulp may undergo one or more steps to obtain a pulp of a different composition and/or form. For example, the pulp may be dried and then ground up to provide a dry product of small particle size which may be used to produce a pet food according to the first aspect of the invention. In accordance with the invention, it is the ultimate pet food product, with a chicory fibre content, which is important.

Without limiting the present invention, the addition of chicory fibres into a pet food product is believed to i) maintain good faeces quality or improve the faeces quality of a pet and/or ii) maintain good GI tract health or improve it, either achieved by one or more of the following: the improvement of faeces water binding, the reduction of faecal pH, the improvement of colonic flora, the enhancement of populations of beneficial bacteria, the enhancement of water/electrolyte uptake in the gastrointestinal tract, the improvement of colonic structure/health and the provision of good water binding features to equalise faecal texture, possibly achieved by the way that the natural fibres are bound in the structured chicory fibre matrix which gives unique benefits not seen with other fibres.

Evaluation of faeces quality and the identification of improvement of faeces quality are techniques well known and used in the art. More than one method can be used (alone or in combination). Methods commonly use a panel of trained obseivers (may be trained members of the pubic or professionals). Faecal samples from a pet are collected and may be scored according to a rating system such as described in EP-A-0 674 842, or (a rather more sophisticated scale) according to a rating system based on a linear scale as follows:

| 0–2.5 | diarrhoea - unformed stools |
| 2.6–5 | unformed - soft formed, moist |
| 5.1–7.5 | soft formed, moist - firm, formed |
| 7.6–10 | firm formed - hard, dry pellets |

The evaluation of good faecal quality is determined according to faecal quality which often reflects a normal gastrointestinal function. This is usually the formation of a stool which is firm and retains its shape. Stools which are hard, pellet-like and dry (and may be produced with straining) or which are produced with a moisture content such that shape is not retained (including diarrhoea), do not represent normal gastrointestinal function. The precise optimum stool consistency may vary somewhat between different types of pet animals and between species of an animal, but can be easily determined on review by a person skilled in the art.

Evaluation of good GI tract health and the identification of improvement of GI tract health are also techniques well known and used in the art. Colonic (or intestinal or digestive) health can be defined in terms of stool quality and pH, the presence and numbers of beneficial and potentially harmful bacteria in faeces and total and specific short chain fatty acids. Stool pH is measured using a solid phase pH electrode on faeces within 1 hour of voiding. Bacteria are sampled from freshly voided faeces and serially diluted before plating onto standard microbiological media. These plates are incubated aerobically and anaerobically at 37° C. for 24 hours, after which time the number of colonies per plate are counted and used to calculate the number of colony forming units per gram of faeces. Beneficial bacteria, such as Bifidobacteria and Lactobacilli and potentially harmful bacteria, such as Clostridia, are identified using selective media, by reference to colony and cell morphology, using Gram stain and identification strips, such as those manufactured by bioMerieuz (France). Faecal short chain fatty acids are extracted into metaphosphoric acid and analysed by gas chromatography.

The remaining components of the pet food product are not essential to the invention and typical standard products can be combined with the required chicory content (whole, fibre and/or pulp). Most preferably, the combined ingredients of the pet food product according to the invention provide all of the recommended vitamins and minerals for the particular pet in question, (a complete and balanced food), for example, as described in National Research Council, 1985, Nutritional Requirements for Dogs, National Academy Press, Washington D.C. or Association of American Feed Control Officials, Official Publication 1996.

The preferred source of chicory fibres are from chicory pulp which have had at least some of the inulin removed by extraction. Preferred levels of chicory pulp for pet food products are from 0.5 to 20% dry weight of the pet food product. As will be understood by persons skilled in the art, the chicory fibre can be added in a dry or a wet form. More preferably, the chicory content level is from 2 to 10% dry weight of the pet food product. These ranges apply to the first aspect of the invention for a variety of pet animals, including animal genus and species. The invention is particularly applicable to mammalian pet animals, especially dogs, cats and horses.

The pet food product is preferably packaged. In this way, the consumer is able to identify, from the packaging, the ingredients in the food product and confirm that it is suitable for the particular pet in question. The packaging may be metal (usually in the form of a tin or flexifoil), plastic, paper or card. The pet food may be a dry, semi-moist or a moist product. Wet food includes food which is sold in tins and has a moisture content of 70 to 90%. Dry food includes food having a similar composition, but with 5 to 15% moisture and presented as small biscuit-like kibbles. The amount of moisture in any product may influence the type of packaging which can be used or is required.

The pet food product according to the present invention encompasses any product which a pet consumes in its diet. Thus, the invention covers standard food products as well as pet food snacks (for example, snack bars, biscuits and sweet products). The food product is preferably a cooked product. It may incorporate meat or animal derived material (such as beef, chicken, turkey, lamb, fish, blood plasma, marrow bone etc or one or more thereof). The product alternatively may be meat free (preferably including a meat substitute such as soya, maize gluten or a soya product) in order to provide a protein source. The product may contain additional protein sources such as soya protein concentrate, milk proteins, gluten etc. The product may also contain a starch source such as one or more grains (e.g. wheat, corn, rce, oats, barley etc), or may be starch free.

The food product can be made according to any method known in the art, such as in Waltham Book of Dog and Cat Nutition, Ed. ATB Edney, Chapter by A. Rainbird, entitled "A Balanced Diet" in pages 57 to 74 Pergamon Press Oxford.

A second aspect of the invention provides the use of chicory to i) maintain good faeces quality or improve the faeces quality of a pet and/or ii) maintain good GI tract health or improve it. The advantages of incorporating chicory into pet food products is as described according to the first aspect and the examples. The features and the preferred features of the first aspect of the invention also apply to the second aspect. Most preferably this aspect relates to the use of chicory fibre to maintain or improve good faeces quality of a pet.

A third aspect of the invention provides chicory, for use to i) maintain good faeces quality or improve the faeces quality of a pet and/or ii) maintain good GI tract health or improve it. Again, features and preferred features of the first and second aspects of the invention also apply to the third. Most preferably this aspect relates to the chicory pulp, more preferably chicory fibre, for use to maintain or improve good faeces quality of a pet.

A fourth aspect of the invention provides method to, i) maintain good faeces quality or improve the faeces quality of a pet and/or ii) maintain good GI tract health or improve it, the method comprising including chicory in the diet of a pet. The method may be, but is not restricted to, veterinarian treatment. The method may be prophylactic or therapeutic. The features and the preferred features of the first to third aspects of the invention also apply to the fourth. Most preferably the method comprising including chicory fibre in the diet of a pet.

A fifth aspect of the invention provides a process for the preparation of a pet food product according to any of the first to third aspects of the invention. The process comprises mixing a form of chicory fibre with one or more ingredients of a pet food product. The product can in all other ways be produced by processes known in the art. The chicory fibre may be added prior to or following heating or cooking of one or more of the other ingredients. The process may also include the step of extracting inulin from chicory plant material. All features of aspects on to four also apply to the fifth.

The invention will now be described with reference to the following, non-limiting examples:

EXAMPLE 1

Evaluation of Different Sources of Fibre in Pet Food by Faeces Screening Studies in Dogs.

Introduction

Three pet food products, each containing a different type of fibre (unrefined, unmollassed Sugar Beet Pulp, Ground Chicory fibre and Arbocel, a synthetic fibre of 100% cellulose) were used in a standard cross-over faeces screening trial in number of adult dogs of the same breed. The chicory fibre was obtained following an inulin extraction process of chicory root (which reduced the inulin content of the chicory down to an approximate maximum of 10% when the pulp is dried to have a 10% moisture level). The wet chicory pulp was dried into shreds, compressed, formed into pellets and then ground. The trial was carried out to evaluate the faeces quality performance of the inclusion of different types of fibre. The trial design was a standard cross-over.

The base pet foods used was canned chunks in gravy product. The recipe ingredients for each diet was:

| Diet (Chunks Recipe) | SBP Fibre | Chicory Recipe | Arbocel |
|---|---|---|---|
| Meat and protein source | 81.92 | 81.92 | 81.92 |
| Wheat Flour | 7.90 | 7.90 | 10.00 |
| Salts | 0.83 | 0.83 | 0.83 |
| Water | 6.15 | 6.15 | 6.15 |
| Sugar Beet Pulp (SBP) | 3.20 | 0.00 | 0.00 |
| Chicory Fibre (Ground) | 0.00 | 3.20 | 0.00 |
| Arbocel | 0.00 | 0.00 | 1.10 |
| Total (%) | 100.00 | 100.00 | 100.00 |

Differences are highlighted in bold. All recipes have a 50% inclusion of gravy (that is gravy added to the chunks at a ratio of 50/50). Gravy is water and thickening agents. All cans were processed at 125° C. for 61 minutes.

Method

The faeces quality was measured in a cross-over design trial, commencing on a panel of 6 adult male Beagles. The dogs used for the trial were numbered 1 to 6.:

The dogs were offered the following amounts of diet each day (g/day based on maintenance feeding levels):

| Dog No. | 1 | 2 | 3 | 4 | 5 | 6 |
|---|---|---|---|---|---|---|
| Diet Amount | 1000 | 1000 | 1200 | 1600 | 1200 | 1500 |

Before the start of each trial week the dogs were fed a standard pet food with the following recipe for 2 days. This routine practice ensures a common base line for the faeces screening studies.

| Diet Recipe | |
|---|---|
| Fish and poultry | 35% |
| Cereals (maize, wheat) | 20% |
| Gravy | 45% |

Faeces quality was measured subjectively on a linear scale as previously described and analysed by ANOVA. Changes in faeces quality were also assessed on an individual day basis to identify whether an adaptation effect was occurring with time.

Results

Acceptance: All dogs ate 100% of the food offered over the 7 day trial.

| | Overall Faeces Quality | | |
|---|---|---|---|
| | % Ideal | % Unacceptable | Mean Score ± SEM |
| Diet with SBP fibre | 40.20 | 20.70 | $5.3^a \pm 0.2$ |
| Diet with Chicory fibre | 60.60 | 9.60 | $6.1^b \pm 0.2$ |
| Diet with Arbocel | 39.20 | 21.50 | $5.1^a \pm 0.2$ |

Faeces quality for the food product with chicory fibre was good. The food product with SBP fibre and with Arbocel produced faeces with moderate/poor quality. The food product with chicory fibre produced significantly better faeces quality than the food product with SBP fibre and the food product with Arbocel (ANOVA, p<0.05).

Faeces Quality on an Individual Day Basis

With the exception of the food product with chicory fibre, there was no significant difference in faeces quality between individual days (ANOVA, p>0.05), indicating that there was no adaptation effect with time.

Individual Dog Performance

The faeces quality for individual dogs is as follows:

| Dog no. | Mean Score +SEM | % Ideal | % Unacceptable | No. of Defaecations |
|---|---|---|---|---|
| Product with SBP fibre | | | | |
| 1 | 6.60$^{ab}$ ± 0.7 | 45.50 | 0.00 | 11.00 |
| 2 | 66$^{b}$ ± 0.7 | 63.60 | 0.00 | 11.00 |
| 3 | 5.3$^{ab}$ ± 0.7 | 18.20 | 9.10 | 11.00 |
| 4 | 4.6$^{a}$ ± 0.5 | 38.10 | 38.10 | 21.00 |
| 5 | 4.9$^{ab}$ ± 0.5 | 38.90 | 27.80 | 18.00 |
| 6 | 5.3$^{ab}$ ± 0.5 | 40.00 | 25.00 | 20.00 |
| Product with Chicory fibre | | | | |
| 1 | 6.7$^{b}$ ± 0.4 | 87.50 | 0.00 | 16.00 |
| 2 | 66$^{b}$ ± 0.4 | 85.70 | 7.10 | 14.00 |
| 3 | 6.6$^{b}$ ± 0.4 | 64.30 | 7.10 | 14.00 |
| 4 | 5.6$^{ab}$ ± 0.3 | 39.10 | 13.00 | 23.00 |
| 5 | 5.0$^{a}$ ± 0.4 | 27.80 | 16.70 | 18.00 |
| 6 | 6.3$^{b}$ ± 0.4 | 73.70 | 10.50 | 19.00 |
| Product with Arbocel | | | | |
| 1 | 6.6$^{c}$ ± 0.6 | 58.30 | 0.00 | 12.00 |
| 2 | 6.3$^{c}$ ± 0.8 | 71.40 | 0.00 | 7.00 |
| 3 | 57$^{bc}$ ± 0.7 | 27.30 | 0.00 | 11.00 |
| 4 | 4.1$^{ab}$ ± 0.5 | 38.90 | 38.90 | 18.00 |
| 5 | 3.7$^{a}$ 0.6 | 28.60 | 57.10 | 14.00 |
| 6 | 5.2$^{abc}$ ± 0.5 | 29.40 | 11.80 | 17.00 |

Within each diet, same letter means NOT significantly different (ANOVA, p>0.05).

Discussion

The product with chicory fibre was good, producing significantly better faeces quality than the product with SBP fibre and the product with Aibocel (ANOVA, p<0.05), both of which produced moderate/poor faeces quality. For all diets, there was no evidence of an adaptation effect occurring with time.

EXAMPLE 2

Evaluation of Different Sources of Fibres in Pet Foods Faeces Screening Studies in Dogs.

Introduction

Three pet food products, each containing a different type of fibre (unrefined, unmollassed Sugar Beet Pulp, Ground Chicory fibre and a standard recipe with flour instead of fibre) were used in a cross-over faeces screening trial in adult dogs. The trial was carried out to evaluate the faeces quality performance of the inclusion of different types of fibre.

The base pet food is a canned chunks in gravy product. The riecipe ingredients for each diet are:

| Diet (Chunks Recipe) | SBP Fibre | Chicory Recipe | Standard |
|---|---|---|---|
| Meat and protein source | 81.92 | 81.92 | 81.92 |
| Wheat Flour | 7.90 | 7.90 | 11.10 |
| Salts | 0.83 | 0.83 | 0.83 |
| Water | 6.15 | 6.15 | 6.15 |
| Sugar Beet Pulp (SBP) | 3.20 | 0.00 | 0.00 |
| Chicory Fibre (Ground) | 0.00 | 3.20 | 0.00 |
| Total (%) | 100.00 | 100.00 | 100.00 |

Differences are highlighted in bold. All recipes have a 50% inclusion of gravy (that is gravy added to the chunks at a ratio of 50/50). Gravy is water and thickening agents. All cans were processed at 125° C. for 61 minutes.

Method

The faeces quality was measured in a standard cross-over design trial, on a panel of 6 adult dogs. The dogs used for the trial were numbered:

| | |
|---|---|
| 7 | Beagle |
| 8 | English Springer Spaniel |
| 9 | Golden Retriever |
| 10 | Labrador Retriever |
| 11 | Labrador Retriever |
| 12 | Miniature Schnauzer |

The dogs were offered the following amounts of diet each day (g/day based on maintenance feeding levels):

| Dog Number | 7 | 8 | 9 | 10 | 11 | 12 |
|---|---|---|---|---|---|---|
| Diet Amount | 1200 | 1200 | 1200 | 1200 | 1200 | 600 |

Before the start of each trial week the dogs were fed standard pet food with the following recipe for 2 days. This routine practice ensures a common base line for the faeces screening studies.

| Diet Recipe | |
|---|---|
| Fish and Poultry | 35% |
| Cereals (maize, wheat) | 20% |
| Gravy | 45% |

Faeces quality was measured subjectively on a linear scale (as previously described) and analyzed by ANOVA. Changes in faeces quality were also assessed on an individual day basis to identify whether an adaption effect was occurring with time.

Results

Acceptance: All dogs ate 100% of the food offered over the 7 day trial.

Overall Faeces Quality

|  | % Ideal | % Unacceptable | Mean Score ± SEM |
|---|---|---|---|
| Product with SBP fibre | 69.40 | 16.10 | $6.2^{ab} \pm 0.2$ |
| Product with Chicory fibre | 86.40 | 3.70 | $6.9^c \pm 0.2$ |
| Product (Standard) | 69.80 | 15.90 | $6.0^a \pm 0.2$ |

Faeces quality for the product with chicory fibre was excellent. Faeces produced by the product with SBP fibre and the Standard was moderate. The product with chicory fibre produced significantly better faeces quality than the product with SBP fibre and the Standard product (ANOVA, $p<0.05$).

Faeces Quaiity on an Individual Day Basis

For the product with SBP fibre and the Standard product, there was no significant difference in faeces quality between individual days (ANOVA, $p>0.05$), indicating that there was no adaptation effect with time. There was no evidence that a true adaptation effect had occurred with time.

Individual Dog Performance

The faeces quality results for individual dogs are shown in the following table. For the standard product there was no significant variation in individual response (ANOVA, $p>0.05$).

For the product with chicory fibre and the product with SBP fibre, there was little significant variation in individual response.

| Dog no. | Mean Score ± SEM | % Ideal | % Unacceptable | No of Defaecations |
|---|---|---|---|---|
| Product with SBP fibre | | | | |
| 7 | $5.0^{ab} \pm 0.4$ | 41.20 | 41.20 | 17.00 |
| 8 | $5.8^b \pm 0.6$ | 66.70 | 22.20 | 9.00 |
| 9 | $6.5^{ab} \pm 0.6$ | 66.70 | 0.00 | 9.00 |
| 10 | $6.9^a \pm 0.4$ | 86.70 | 6.70 | 15.00 |
| 11 | $7.2^{ab} \pm 0.6$ | 87.50 | 0.00 | 8.00 |
| 12 | $7.5^{ab} \pm 0.8$ | 100.00 | 0.00 | 4.00 |
| Product with chicory fibre | | | | |
| 7 | $6.0^b \pm 0.2$ | 57.10 | 14.30 | 21.00 |
| 8 | $7.3^a \pm 0.3$ | 100.00 | 0.00 | 12.00 |
| 9 | $7.3^a \pm 0.3$ | 90.90 | 0.00 | 11.00 |
| 10 | $5.6^a \pm 0.2$ | 100.00 | 0.00 | 19.00 |
| 11 | $7.2^a \pm 0.3$ | 91.70 | 0.00 | 12.00 |
| 12 | $7.4^a \pm 0.4$ | 100.00 | 0.00 | 6.00 |
| Standard Product | | | | |
| 7 | $5.4^a \pm 0.5$ | 57.10 | 28.60 | 21.00 |
| 8 | $5.2^a \pm 0.6$ | 50.00 | 21.40 | 14.00 |
| 9 | $7.0^a \pm 1.0$ | 80.00 | 0.00 | 5.00 |
| 10 | $6.6^a \pm 0.6$ | 85.70 | 7.10 | 14.00 |
| 11 | $7.5^a 0.8$ | 100.00 | 0.00 | 7.00 |
| 12 | $7.3^a \pm 1.5$ | 100.00 | 0.00 | 2.00 |

Within each diet, same letter means NOT significantly different (ANOVA, $p>0.05$).

Discussion

The product with chicory fibre was excellent, producing significantly better faeces quality than the product with SBP fibre and the Standard, both of which produced moderate faeces quality. For all diets, there was no evidence of an adaptation effect occurring with time.

For the standard product, there was no significant variation in individual response. For the product with chicory fibre and the product with SBP fibre, there was little significant variation in individual response.

EXAMPLE 3

A pet food product (wet) was prepared which contained chicory fibre (ground), but no starch source. The concentrations of ingredients were as per Example 2, with the wheat flour substituted with extra meat and protein sources. Gravy was added as per Example 2. The gravy contained water and guar as the thickening agent. Good results as per Examples 1 and 2 were obtained.

Other Embodiments

It is to be understood that, while the invention has been described in conjunction with the detailed description thereof, the foregoing description is intended to illustrate and not limit the scope of the invention. Other aspects, advantages, and modifications of the invention are within the scope of the claims set forth below.

I claim:

1. A pet food product which comprises chicory pulp in an amount which: i) maintains good faeces quality or improves the faeces quality of a pet and/or ii) maintains good gastrointestinal tract health and/or improves the gastrointestinal tract health of a pet.

2. A pet food product as claimed in claim 1, wherein the chicory pulp comprises from 0.5 to 20% dry weight of the pet food product.

3. A pet food product, as claimed in claim 2, wherein the chicory pulp comprises from 2 to 10% dry weight of the pet food product.

4. A pet food product, as claimed in claim 1, wherein the pet food is packaged.

5. A pet food product, as claimed in claim 1, wherein the pet is a dog, cat or a horse.

6. A pet food product, as claimed in claim 1, which is a dry, semi-solid or a moist product.

7. A process for the preparation of a pet food product as claimed in claim 1, the process comprising mixing the chicory pulp with one or more ingredients of a pet food product.

8. The process of using chicory pulp in the manufacture of a pet food product, wherein the pet food product results in i) maintaining good faeces quality or improving the faeces quality of a pet and/or ii) maintaining good gastrointestinal tract health and/or improving the gastrointestinal tract health of a pet when the pet food product is fed to a pet.

9. The process of using chicory pulp, as claimed in claim 8, in an amount of from 0.5 to 20% dry weight of a product.

10. The process of using chicory pulp, as claimed in claim 9, in an amount of from 2 to 10% dry weight of a product.

11. The process of using chicory pulp, as claimed in claim 8, in a dry, semi-moist or a moist product.

12. A pet food product which comprises chicory pulp in an amount from 0.5 to 20% dry weight of the pet food product.

13. A pet food product, as claimed in claim 12, wherein the chicory pulp comprises from 2 to 10% dry weight of the pet food product.

14. A pet food product, as claimed in claim 12, wherein the pet food is packaged.

15. A pet food product, as claimed in claim 12, wherein the pet is a dog, cat or a horse.

16. A pet food product, as claimed in claim 12, which is a dry, semi-solid or a moist product.

17. A pet food product, as claimed in claim 12, wherein the pet food product results in i) maintaining good faeces quality or improving the faeces quality of a pet and/or ii) maintaining good gastrointestinal tract health and/or improving the gastrointestinal tract health of a pet when the pet food product is fed to a pet.

\* \* \* \* \*